(12) United States Patent
Adams et al.

(10) Patent No.: US 8,650,484 B1
(45) Date of Patent: Feb. 11, 2014

(54) SYSTEMS AND METHODS FOR CREATING COMPUTER CONTENT USING MULTIPLE EDITING CONTEXTS

(75) Inventors: Rob Adams, San Francisco, CA (US); Narciso B. Jaramillo, Piedmont, CA (US); Ethan A. Eismann, Oakland, CA (US); Peter Flynn, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 826 days.

(21) Appl. No.: 12/391,744

(22) Filed: Feb. 24, 2009

(51) Int. Cl.
*G06F 17/00* (2006.01)

(52) U.S. Cl.
USPC .......................................... 715/255; 715/200

(58) Field of Classification Search
USPC ................................................. 715/200, 255
See application file for complete search history.

(56) References Cited

U.S. PATENT DOCUMENTS

| | | | |
|---|---|---|---|
| 5,664,208 A * | 9/1997 | Pavley et al. | 715/209 |
| 2007/0200873 A1* | 8/2007 | Hsu | 345/629 |
| 2009/0064005 A1* | 3/2009 | Cunningham et al. | 715/764 |

OTHER PUBLICATIONS

Illustrator CS3 Users Guide, 2007, Adobe, pp. 1-495 (pdf).*

* cited by examiner

*Primary Examiner* — Manglesh M Patel
(74) *Attorney, Agent, or Firm* — Kilpatrick Townsend & Stockton LLP

(57) ABSTRACT

The disclosed methods and systems provide a computer content creation application that allows movement and use of components between editing contexts. Different editing contexts may result where the content utilizes instances of one or more components that are defined outside the outer context in which the instances are used. In another example, different editing contexts result where components are, for one reason or another, stored in separate locations. Embodiments disclosed herein further facilitate developing and using of multi-editing context computer content by providing techniques for organizing parts of content according to content editing context. Other embodiments organize such parts based on the particular editing and use functionality available in a current editing context. Certain embodiments simplify and facilitate a user's ability to move components from an outer or general context into another context, such as into a particular component's instance definition.

24 Claims, 5 Drawing Sheets

SYSTEMS AND METHODS FOR CREATING COMPUTER CONTENT USING MULTIPLE EDITING CONTEXTS

FIELD

Embodiments relate generally to computing and specifically to computing applications used to create and distribute applications and other computer content.

BACKGROUND

Computer content creation applications allow the creation of a piece of content that includes multiple components. In many situations these components are editable directly using a graphical user interface of the application. However, in some situations, a component has a definition, contents, behavior, interactivity or other features that are somehow isolated. Some applications provide an "edit-in-place" or isolation mode feature that allows editing of such components. For example, in Adobe® Flash®, an instanceable object can be created from a drawn object so that the definition is stored in a library and multiple instances of the created object can then be used throughout the piece of content being created. An edit-in-place feature can be used to edit the appearance or behavior defined by the instanceable object's definition. For example, a creator may select an instance of the object, enter an edit-in-place mode, and modify the object's definition. When the creator exits, other instances will also reflect the changes. Generally, an "edit-in-place" editing context provides a way to initiate editing of an object definition starting from an object instance.

Generally, in an edit-in-place editing context only the object definition components are editable and available. For example, during edit-in-place of a button object, only the button's graphics, size, behavior and other features may be edited or used. While in an edit-in-place mode, components from outside or other contexts are generally grayed-out or otherwise distinguished as components that cannot be edited or used. Preventing access to and editing of these external components is intended to help the creator more easily understand and visualize what is part of the object definition and what is not. In the absence of such a limitation, there may be ambiguity with respect to changes made on an editing canvas area. For example, if a component is moved to an area of the canvas occupied by the object instance, it may be unclear whether the move was intended to make the moved component a part of the object definition or simply move it to a new location. To avoid this type of ambiguity, creation applications generally do not allow moving objects between contexts and restrict canvas editing to one such context at a time.

Adobe® Illustrator® provides a development interface that presents content being developed on a canvas area and uses a "layers" panel to illustrate the relationships, hierarchy, or nesting of different content components, folders, and anything that can have sub components. A user can use the layers panel to re-order items and drag components between different layers. However, the layers panel only shows the current editing context. Thus, in an edit-in-place mode, the "layers" panel shows only components that are already part of the definition being edited. Moving a component from outside the definition editing context to within the definition editing context requires exiting the edit-in-place mode, selecting the component, cutting it, reentering the edit-in-place mode, pasting it, and positioning the pasted-in component on the canvas.

Generally, edit-in-place editing is cumbersome in certain scenarios because it restricts access to content outside of the edited context. When a definition is being edited, content from the main application content is not accessible for use. This is problematic, for example, in circumstances where a creator wishes to move artwork from the main application into a component definition. For example, a creator may select several pieces of artwork for creating a button component and, after creation of the button component, realize that one or more additional pieces of artwork were inadvertently not selected for inclusion. To bring that artwork into the component, the creator must exit the edit-in-place mode, find the artwork to bring in, select it, cut it, and then go back into the edit-in-place mode and paste it in an appropriate location. This process is cumbersome and prone to user confusion. Users also want to make sure that when the component is moved, it retains its location. This process makes ensuring such placement difficult and time consuming.

SUMMARY

The disclosed methods and systems provide a computer content creation application that allows movement and use of components between editing contexts. The computer content can be developed as part of a computer content creation project that creates a computer application, a graphic design, a document, or any other type of rich media or other computer content. Different editing contexts may result where the content utilizes instances of one or more components that are defined outside the outer context in which the instances are used. In another example, different editing contexts result where components are, for one reason or another, stored in separate locations. Embodiments disclosed herein further facilitate developing and using of multi-editing context computer content by providing techniques for organizing parts of content according to content editing context. Other embodiments organize such parts based on the particular editing and use functionality available in a current editing context. Certain embodiments simplify and facilitate a user's ability to move components from an outer or general context into another context, such as into a particular component's instance definition or vice versa.

One exemplary method involves presenting a first editing context of a project, the first editing context comprising a set of one or more objects within the project. This exemplary method further comprises receiving a request to edit something associated with a first object of the one or more objects, wherein the editing occurs in a second editing context different from the first editing context. The exemplary method further comprises, in response to the request, entering the second editing context wherein only things associated with the first object are accessible for editing. However, the original set of objects remains accessible for use within the second editing context. For example, the objects may be available via a panel listing or otherwise displaying the objects of the original set. The objects from the first editing context may also be distinguished from the objects from the second editing context on, for example, a graphical editing canvas and/or within a panel or other component used to list or display the objects.

In embodiments using a panel to list, display, or allow use of objects associated with different editing contexts, such a panel may display a hierarchy of objects, provide indications of the particular editing context that each object is associated with, and/or provide an indication of whether an object can be edited in the second (i.e., current) editing context. To facilitate user understanding and ease of use, such a panel may group objects by editing context and allow objects to be moved between contexts by allowing a user to move (e.g., drag) objects between groupings. In a hierarchy, moving a component with hierarchical children may move the component and all of its children.

In other embodiments, a computer-readable medium (such as, for example, random access memory or a computer disk) comprises code for carrying out the methods and systems described herein.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the certain embodiments are better understood when the following Detailed Description is read with reference to the accompanying drawings, wherein.

DETAILED DESCRIPTION

Certain embodiments facilitate the creation of content including computer content developed as part of a computer content creation project that creates a computer application, a graphic design, a document, or any other type of rich media or other computer content. Certain embodiments provide a creation application that facilitates the creation of computer content comprising multiple components and that allows movement and use of components between editing contexts in an unambiguous way. For example, a creation application may provide a layers panel that facilitates such movement between editing contexts. A layers panel may provide different sections for the different editing contexts. This "stack" of sections in the layers panel allows components from different editing contexts to be presented separately from one another but still used together. For example, it may still allow a creator to drag something from the editing context of one stack to the editing context of another.

The terms "object," "component," and "item" are used herein to generally refer to anything that can be included within applications or other content that are created for use on a computing device. The terms are not limited to graphics, data, or contents having other particular attributes.

Figure 1:
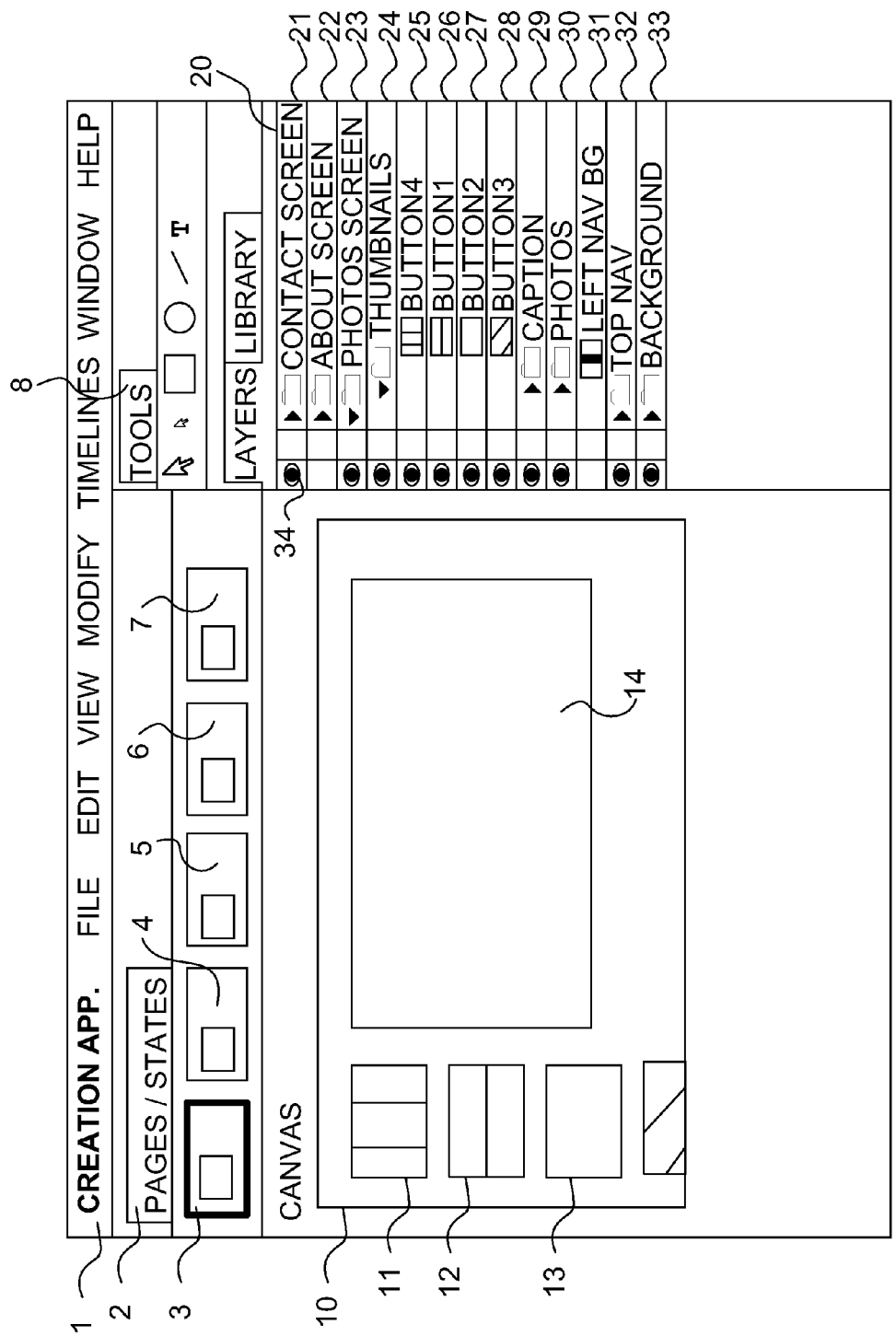
FIG. 1 illustrates an exemplary user interface of a creation application that allows editing of a component in one context while having components from other contexts available, according to certain embodiments.

Referring now to the drawings in which like numerals indicate like elements throughout the several figures, FIG. 1 illustrates an exemplary user interface 1 of a creation application that allows editing of a component in one context while having components from other contexts available, according to certain embodiments. Various components 11, 12, 13, 14 are displayed and can be edited on the canvas area 10. For example, the components 11, 12, 13, 14 may be resized and moved around on the canvas area 10. The user interface 1 also includes various tools 8 that can be selected and used to create drawings and other components on the canvas area 10. The user interface 1 also includes a layers panel 20 that lists in hierarchical or nested form the various layers 21-33 of the content being created. In this example, layers 21-33 essentially correspond one to one with the components 11-14 shown in the canvas area 10. Marker 34 indicates items that can currently be edited on the canvas area 10.

Not all aspects of the components displayed on the canvas area 10 may be editable. For example, the canvas area may display a component that is an instance of a re-useable component that is defined elsewhere. When not in an edit-in-place mode, the user may not be able to see or edit aspects of such components. For example, a definition of a reusable component may be stored and edited separately from instances of that component. The user interface 1 may, however, provide an image showing how the re-useable component appears and allow selection of the component to enter an edit-in-place mode for editing the component definition.

Figure 2:
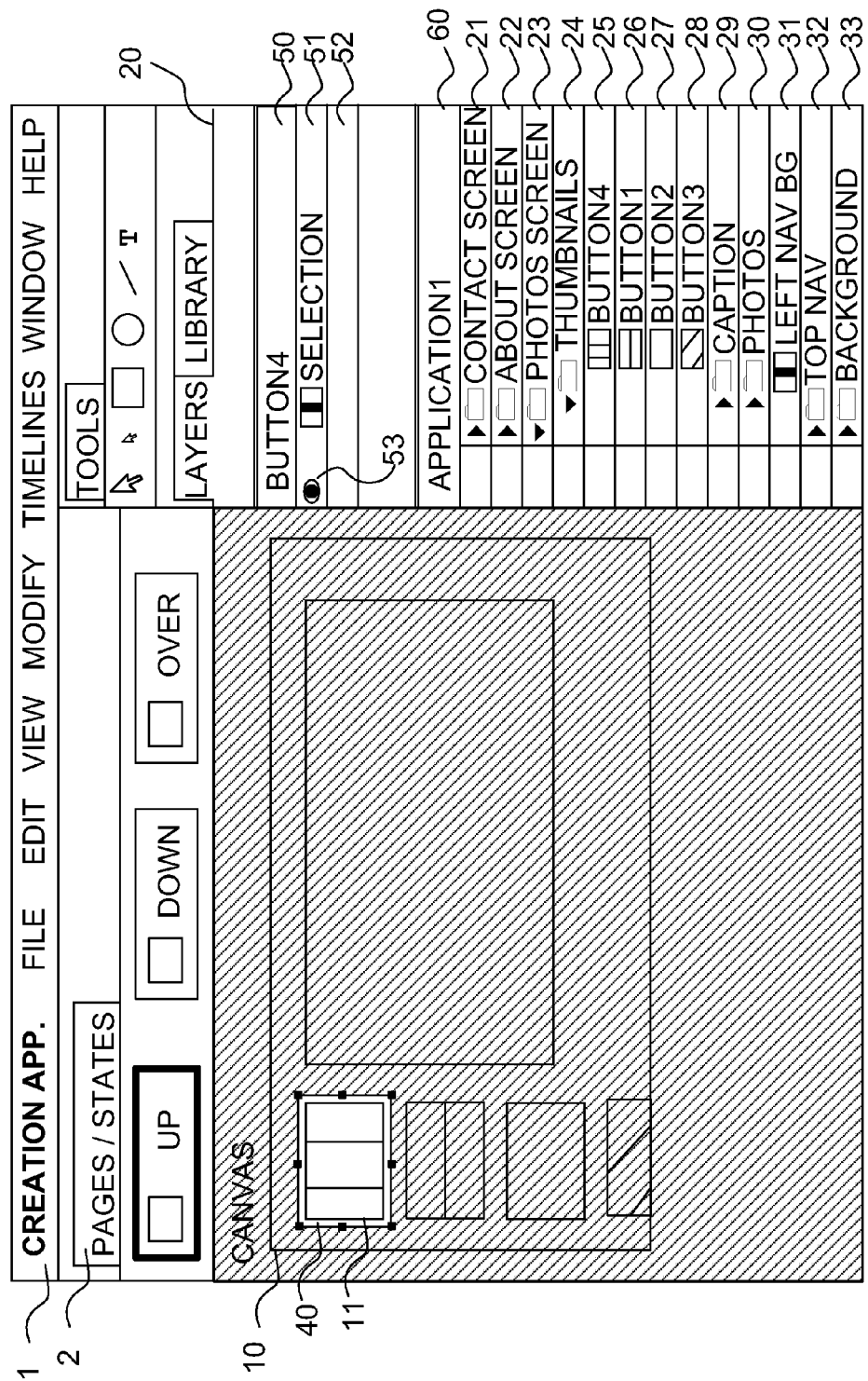
FIG. 2 illustrates editing-in-place of a component of the user interface of FIG. 1, according to certain embodiments.

FIG. 2 illustrates editing-in-place of a component of the user interface 1 of FIG. 1, according to certain embodiments. In this example, edit-in-place mode has been initiated for button 11, which is shown as selected with selection indicator 40. The other components of the canvas area 10 are not available for editing as shown by diagonal lines (in FIG. 2), coloring, shading, or other indicia. While editing the button definition, other components and component attributes such as artwork used in other components that are outside of the current button context are still available for use via the layers panel 20.

In this example, there are two sections in the layers panel 20. The first section 50 corresponds to the contents of the current context for the button 11 that is being edited in edit-place-mode. Marker 53 indicates that a selection layer 51 can be edited on the canvas area while in the present context. The bottom section 60 of the layers panel 20 corresponds to components from the outer application context. A user can include artwork in the button 11 from another component by dragging the artwork up into the button 11 portion 50 of the layers panel 20. Components in the bottom section 60 are from another context than the context currently being edited and thus do not include edit allowed markers. This provides a visual indication to a user that the user cannot directly edit these components in the present context. However, the presence of the components in the layers panel indicates that the components are available for use (moving, copying, etc). For example, a component may be dragged to a new location in the layers panel 20. Generally, a user can interact with the layers panel 20 to pull things from outside of the button editing context to within that context and vise versa. Unlike past creation applications, the user has access to components or other layers that are not part of the editing context currently being used.

A layers panel or other creation application feature may delineate between two or more contexts in a variety of ways to make it clear which context is being edited, for example, that the user is editing a button's definition separate from the outer context in which button instances are used. In addition, the creation application may allow use of components and other layers from outside the currently edited context in a variety of ways. Certain embodiments utilize gestures and methods already familiar to many content creations, for example, allowing users to use a drag gesture to move items between the two contexts. Alternative embodiments provide other means of moving or otherwise using components between contexts. For example, such commands may be controlled from a separate menu on a user interface or accessed via other gestures such as a specific mouse command sequence. For example, if a user wanted to bring in a text component from another context, the user may right click and initiate a "bring into" or similar command.

Certain embodiments are advantageous in circumstances in which a multi-state component is being created from a collection of pieces of artwork. Often users will convert artwork into a component such as a button, and only have the artwork available for the one of the component's states, such as a button's up state. After the component is created, the user realizes the need to bring in additional artwork for another state, such as the button's over state. The artwork for the over state may already be in the application. In certain embodiments, the user is able to use a layers panel or other functionality to move the artwork from the application context to the component's context. In the button example, the user may drag the artwork to the button's context's over state in a layers panel, as an example.

In the embodiments shown in FIGS. 1 and 2, the user interface 1 includes a pages/states portion 2 that allows selection of a page or state of content being developed. If a particular component or definition, such as a button, is selected for editing, the pages/states portion 2 allows selection of a state of the component to edit in the canvas area 10 of the user interface 1. In FIG. 1, a first page 3 of the piece of content is selected in pages/states portion 2 and is being edited in the canvas area 10. Unselected pages 4, 5, 6, 7 are available for selection in the pages/states portion 2. Certain embodiments will not use pages or states. However, certain embodiments provide convenient mechanisms for working with multi-page and/or multi-state content that is edited in multiple editing contexts.

These illustrative examples are given to introduce the reader to the general subject matter discussed herein. The disclosure is not limited to these examples. The following sections describe various additional embodiments and examples of methods and systems for facilitating client side encoding of content.

Figure 3:
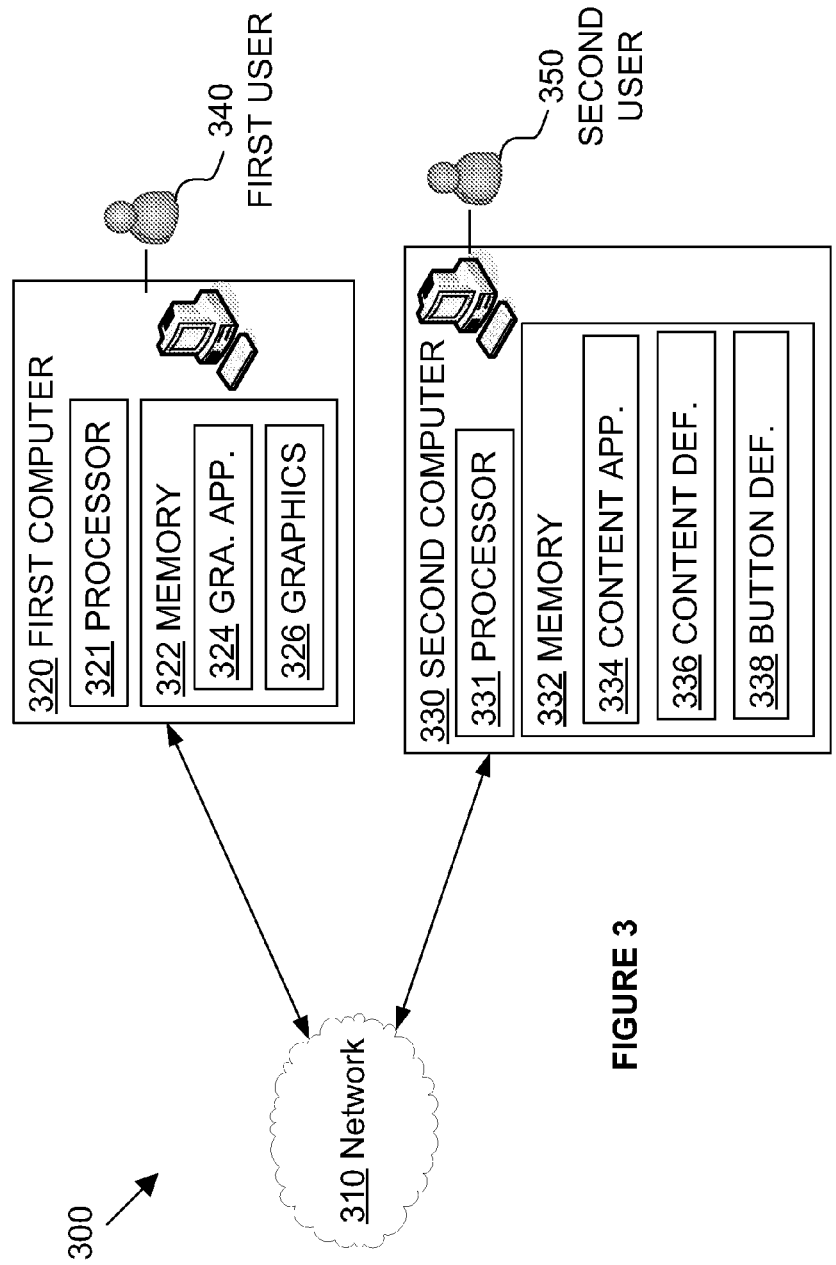
FIG. 3 is a system diagram illustrating an exemplary computing system in which content can be developed, according to certain embodiments.

FIG. 3 is a system diagram illustrating an exemplary computing system 300 in which content can be developed according to certain embodiments. The computing system 300 comprises various exemplary computing devices 320, 330 connected or otherwise in communication with one another via a network 310. Each computing device 320, 330 may comprise a processor 321, 331 and a memory 322, 332, and other computer peripheral devices and software as is known in the art. Computing system 300 is provided as an example to facilitate explanation of certain features of certain embodiments. In this example, the memory 322 of the first computer comprises a graphics creation application 324 and graphics 326 created by that application. The second computer 330 memory 332 includes a content creation application 334, an exemplary content definition 336, and an exemplary button definition 338. Other embodiments may utilize various alternative computing systems, including systems involving a single computing device and/or a single content creation application. In addition, none of the represented components should be considered essential to any embodiment or feature discussed herein.

FIG. 3 provides an example of a system 300 that facilitates a common content creation workflow. In such a workflow, a first user 340 creates graphics 326 using a graphics creation application 324 and provides those graphics 326 for a second user 340 to create other content. For example, the first user 340 may create the artwork that is subsequently used by the second user 350 to create a button component as part of an application project. The first user 340 may graphically design the appearance of the button by creating text and image components. The first user may define or otherwise create graphics that are relevant to only certain states of the button. For example, the first user 340 may draw a pink square button with some text on it and a partially transparent white box that is intended to be displayed over the other button components to create a white sheen in the mouse over state of the button. The first user 340 may hide this white box layer for various reasons, for example, so that the button component can be provided will other components as part of an overall application design that shows the appearance of the application. In such a case, the first user 340 may hide the white box layer so that the overall design can be seen in its more typical or common state in which the button is not moused over. The hidden box is still present but is not visible. Other techniques can, of course, be used to overlay or create overlapping elements of a design for different states of the design.

After creating the graphics 326, the first user 340 may then send the graphics 326 for the button to the second user 350. The second user 350, in this exemplary workflow, imports these graphics 326 into a content creation application 334 and performs various tasks to make a button definition 338 using these graphics 326. The second user selects the graphics 326 and executes a convert artwork to button component command in the content creation application 334. After creating the button definition 338, the second user may edit the button definition 338 by entering an edit-in-place mode. While editing the button, the second user 350 may want to add something from outside the button context. For example, the second user may notice that the white box (used to create the sheen in the mouse over state) was inadvertently left out when the button was created and thus was left outside the button context.

Embodiments provide various ways for the second user 350 to access such a component without exiting the button editing context. For example, the creation application user interface may provide a layers panel that allows components and other layers to moved within and between contexts. In this exemplary situation, the second user 350 is able to move the white box layer from the outer context to within the button's context and, specifically, to within the over state layer defined in the button editing context. The second user 350 is able to make this change in an unambiguous way without having to leave the button editing context, search for the potentially hidden graphic, cut the graphic, return to the button context, paste the graphic, and/or ensure the graphic is in an appropriate position relative to other features. Thus, generally, cross context component/layer access provides various benefits in situations involving importing multiple components and selecting some of those to create a component definition.

Certain embodiments allow a content creator to see and use items from two or more separate editing contexts at the same time and have the ability to move items between those contexts. In some embodiments, when the user edits-in-place, to avoid confusion, the canvas area grays out items on the canvas area that cannot be edited while another portion of the creation application provides access to those items. For example, a layers area may list the various contexts and, for each, provide an expandable listing of the layers. Separating the contexts can help avoid user confusion. Various other techniques can be used to visually separate or distinguish layers from different editing contexts.

It should be noted that content may be created with instances of components defined elsewhere for a variety of reasons. For example, a user may do so as a means to get the built-in behavior or functionality that a component offers. As another example, a component may be reused multiple times through a piece of content and the definition/instance paradigm can provide an efficient means of managing multiple objects that have some or all common attributes. Having a master definition that is shared between multiple copies simplifies change by allowing a user to update the definition and have changes automatically reflected in all instances. A third reason to separately define a component from the content in which the component is used is to add flexibility. A component may also be created so that a definition with its own set of states/pages can be maintained independently. Generally, a definition/instance scenario may be appropriate or desirable in a variety of situations in which an embedded asset having its own substructure that is not part of the current context is desirable.

Embodiments relate to any content including content that does not utilize the definition/instance paradigm and content that is non-graphical. For example, a content creation application may be used to create a music sequence that includes other smaller pieces of music and another item that is also itself a sequence (perhaps stored in a separate file or files). The creation application may allow a user to edit the subsequence in as a separate context from the main sequence and provide mechanisms for moving pieces of music from one context to another. For example, the different pieces of music may be presented as layers in a segmented layers list.

Generally, embodiments provide various techniques that facilitate using and editing items from two or more different editing contexts. In some situations, the editing contexts are different from one another because the items in that content are stored separately from items in other contents. Embodiments provide convenient, easy to use features for using and changing these multi-context items.

Moving an object from one context to another may involve preserving positional and other attributes of the object. For example, if a user drags text from one context to another, the text may be automatically positioned in the same relative position, such as, for example, centered on the object, etc. Alternatively, absolute position (that is, the same position relative to the overall canvas) may be maintained by adjusting an item's position coordinates, such as by adjusting an item's parent-relative coordinates as the parent changes to maintain the same absolute position. If the contexts are different, changes can be automated or based on user prompted feedback. For example, if a user moves an image into a button where the image is larger than the button boundaries, the image may be resized to fit within the button or cropped accordingly. Alternatively, the button boundary may be increased to accommodate the larger image size. Generally, the boundaries or the origin of an editing context may be different from that of an outer or other context. This may require translating coordinates, which can be done in a variety of ways, for example, using various kinds of different algorithms. However an object comes into a given context, a user may be in a convenient circumstance (i.e., still editing within that context) to manually adjust the object if necessary or desired.

Certain embodiments involve managing multiple levels of nested components in which each level can be associated with a different editing context. For example, an application may contain an instance of some component like a scroll bar which has an arrow button component which is an instance of a general arrow button definition. Certain embodiments provide a vertical stack in a layers panel or elsewhere that organizes multi-level editing contexts. A top level may show components or layers associated with the arrow button. Then, underneath that there may be a stack of all the other scroll bars layers from the outer context and then below that, another stack of all the layers from the outermost document. Thus, embodiments facilitate the use of more than just a first and second editing context and simplify the use and reuse of components and other layered features in multi-context content development.

Figure 4:
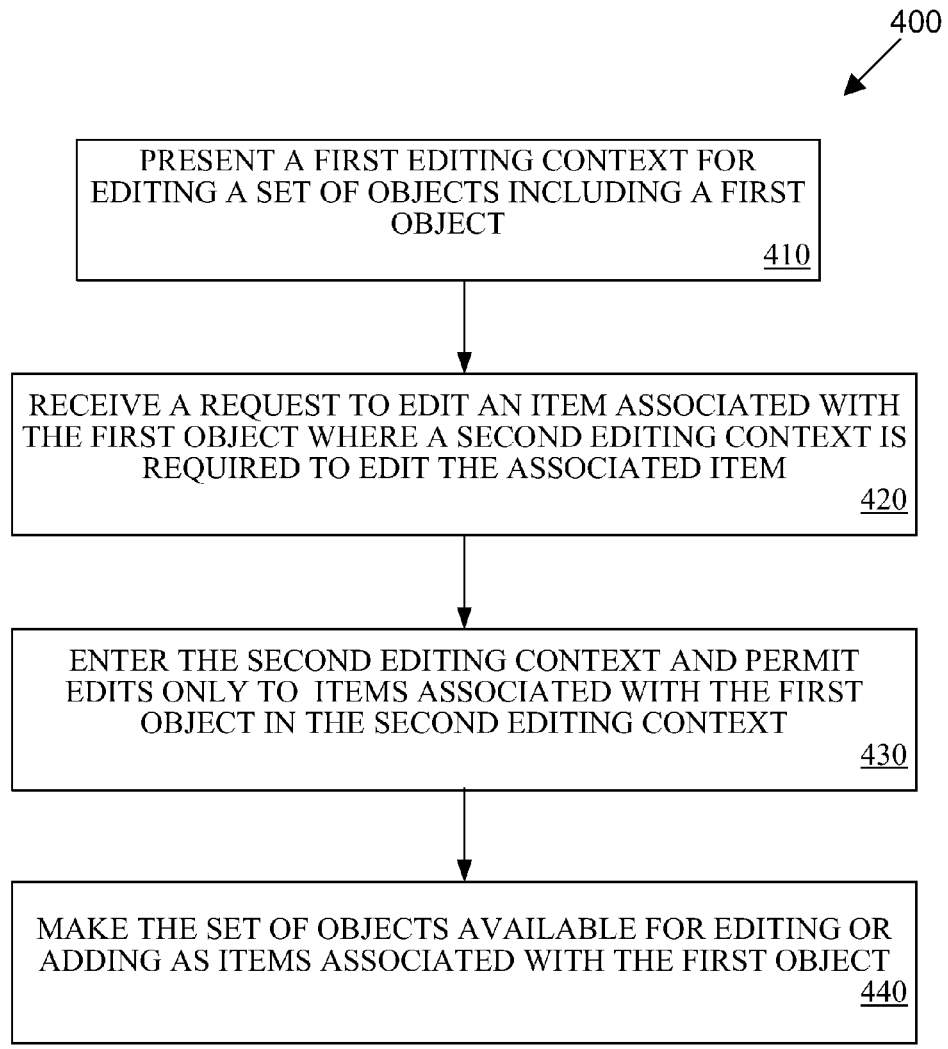
FIG. 4 is a flow chart illustrating exemplary method of editing content having components or other objects that are edited in different editing contexts, according to certain embodiments.

FIG. 4 is a flow chart illustrating exemplary method 400 of editing content having components or other objects that are edited in different editing contexts, according to certain embodiments. The method 400 comprises presenting a first editing context in a graphical user interface, the first editing context comprising a set of one or more objects that includes a first object, as shown in block 410. For example, the set of objects may be a set of objects included in an application development project. Exemplary objects may include graphical components that are displayed on an interface that is being developed as part of a computer software application or content being developed. An exemplary graphical user interface may be used presented as part of a content creation application or project to create content, included but not limited to, applications, documents, graphics, and rich and other types of computer content.

The method 400 further comprises receiving a request to edit an item associated with the first object, as shown in block 420. A second editing context is required to edit the associated item. For example, the item associated with the first object may be a hierarchical child of the first object, and the child (along with potentially other hierarchical children) may be edited in a different context. As another example, the associated item may be a definition and the first object may be an instance of the definition. For various reasons, the definition may be edited in a different editing environment, such as an edit-in-place context, then the instances of that definition.

The method 400 further comprises entering the second editing context and permitting edits only to items associated with the first object in the second editing context, as shown in block 430. An interface may mark content that cannot be edited to distinguish it from content that can be edited. The second editing context is provided as part of a graphical user interface, such as one provided as part of a content creation application or project to create content, included but not limited to, applications, documents, graphics, and rich and other types of computer content. Additional editing contexts may also be used and presented as part of the graphical user interface.

Figure 5:
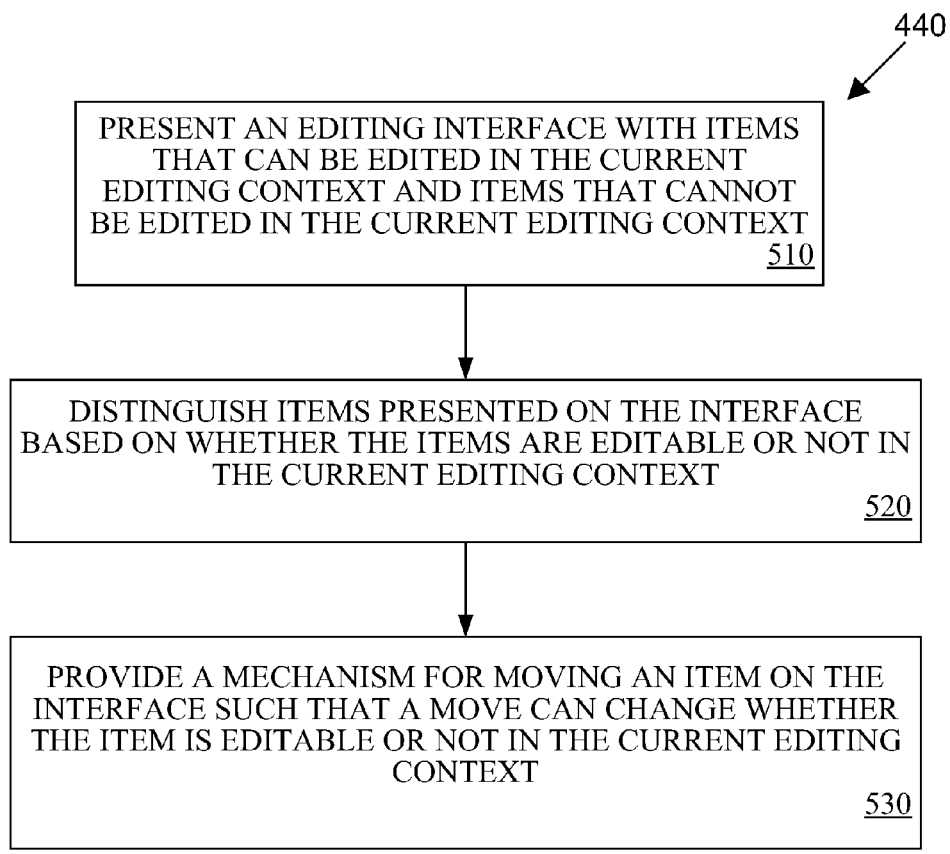
FIG. 5 is a flow chart providing an exemplary method of making the set of objects accessible for use in editing or adding items associated with the first object within the second editing context, according to certain embodiments.

The method 400 further comprises making the original set of objects accessible for use in editing or adding items associated with the first object, as shown in block 440. FIG. 5 is a flow chart providing an exemplary method 440 of making the original set of objects accessible for use in editing or adding items associated with the first object, according to certain embodiments. This exemplary method 440 involves presenting an editing interface that presents both items that can be edited in the current editing context and items that cannot be edited in the current editing context, as shown in block 510. The editing interface may be presented as part of the graphical user interface used to provide the first, second, and potentially other editing contexts.

This exemplary method 440 further involves distinguishing items based on whether the items are editable or not in the current editing context, as shown in block 520. For example, the interface may comprise a panel that presents grouping of items based on the editing context. Such a panel may also display a hierarchy of items. For example, if the current editing environment relates to an object definition, and the panel makes a set of objects available from outside of the definition, the panel may group definition items separate from a group of the set of objects from outside the definition. A panel may provide an indication of which context each object or item is edited within and/or an indication of whether an object can be edited in the current editing context.

The exemplary method 530 further comprises providing a mechanism for moving an item on the interface such that a move can change whether the item is editable or not in the current editing context, as shown in block 530. As a specific example, the interface may allow a user to move an object from outside a definition to within a definition. As another example, a move may bring an item from outside an object to within the object, such that the item becomes a hierarchical child of the object. Moving an object or other item may involve moving all of the hierarchical children of the item. Movement of an object or other item may be received as any type of command orgesture, such as a user dragging an item from one group of items to another in a panel. In the case of objects or items associated with graphics or graphical layouts, moving an item to a new editing context may preserve or determine appropriate characteristics for the moved item. For example, a text item that was centered in its location in a first editing context may be centered in its resulting location after being moved to a second editing context. For example, if a graphic is moved to within an object definition, the graphic may be centered and/or appropriately resized based on the graphical environment associated with the new editing environment, which, in this case, is the graphical environment associated with the object definition. Thus, if the object definition pertains to a button object having a particular size boundary an image moved to within that definition may be resized and/or cropped according to that particular size boundary.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

Certain embodiments provide techniques for facilitating editing and use of components and other layers of multi-context content. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, ActionScript, MXML, and CSS.

While the network shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

What is claimed is:

1. A computer implemented method comprising:
   presenting a first editing context within a graphical user interface, the first editing context comprising a set of one or more objects that can be edited within the first editing context;
   receiving a request to edit an item associated with a first object, wherein editing the item associated with the first object occurs in a second editing context different from the first editing context;
   in response to the request, entering the second editing context wherein only items associated with the first object are accessible for editing, wherein a second object is not accessible for editing while in the second editing context; and
   while in the second editing context, associating the second object with the first object, wherein associating the second object with the first object changes the second object to be accessible for editing while in the second editing context;
   wherein, while in the second editing context, objects not accessible for editing are distinguished from the items that are editable in the second editing context.

2. The method of claim 1, further comprising, in the second editing context:
   receiving a gesture to associate a second object with the first object; and
   in response to receiving the gesture, associating the second object with the first object and allowing the second object to be edited in the second editing context.

3. The method of claim 2, wherein objects of the set of objects remain accessible for use via a panel that allows those objects to be accessed in the second editing context.

4. The method of claim 3, further comprising, in the second editing context:
   receiving a gesture to associate a second object with the first object; and
   in response to receiving the gesture, associating the second object with the first object and allowing the second object to be edited in the second editing context.

5. The method of claim 4, wherein the gesture comprises dragging the second object in the panel to a location in the panel corresponding to the items associated with the first object.

6. The method of claim 5, wherein a position of the dragged object is preserved on a canvas area displaying the items associated with first object.

7. The method of claim 3, wherein the panel displays a hierarchy of objects.

8. The method of claim 3, wherein the panel provides a graphical indication of which context is usable to edit each object.

9. The method of claim 3, wherein the panel provides an indication of whether an object can be edited in the second editing context.

10. The method of claim 3, wherein the panel groups objects by editing context.

11. The method of claim 10, wherein objects and items can be moved from one group to another to change the editing context of an object or item that is moved.

12. The method of claim 11, wherein the object or item that is moved has hierarchical children that are moved along with the object or item.

13. The method of claim 3, wherein a grouping of objects or items can be moved in the panel.

14. The method of claim 1, wherein, in the second editing context, layers of the first object are accessible for editing.

15. The method of claim 1, wherein the first object is one instance of a definition useable to create one or more instances that are edited in the first editing context.

16. The method of claim 1, wherein the first object comprises content stored separately from the set of objects.

17. The method of claim 16, wherein a first file stores the set of objects and a second file, different from the first file, stores the items associated with the first object.

18. The method of claim 1, wherein objects of the set of objects editable in the first editing context and available for association with the first object are graphically distinguished from the items already associated with the first object that are editable in the second editing context.

19. The method of claim 18, wherein objects of the set of objects editable in the first editing context and available for association with the first object appear grayed out.

20. A system comprising:
   a memory coupled to a processor;
   a component stored in said memory and executable by said processor for editing an appearance of a computer content creation project, wherein, in a first editing context, the component for editing allows editing of a set of one or more objects within the project and, in a second editing context, the component for editing, when executed by said processor, allows editing of a definition of an object of the set of one or more objects but does not allow editing of the set of one or more objects; and
   a component stored in said memory and executable by said processor for moving objects from one editing context to another editing context, wherein the component for moving objects, when executed by said processor, provides access to the set of objects within the second editing context to associate one or more of the set of objects with the object to thereby change the one or more of the set of objects to be items accessible for editing while in the second editing context, wherein the component for moving objects, when executed by said processor, distinguishes objects from the first editing context from the objects from the second editing context.

21. The system of claim 20, wherein the component for moving objects separates objects into stacks based on editing context.

22. The system of claim 21, wherein the component for moving objects identifies operations that are not available for objects depending on the editing context of the component for editing.

23. A non-transitory computer-readable medium on which is encoded program code, the program code comprising:

program code for presenting a first editing context within a graphical user interface, the first editing context comprising a set of one or more objects that can be edited within the first editing context;

program code for receiving a request to edit an item associated with a first object, wherein editing the item associated with the first object occurs in a second editing context different from the first editing context;

program code for, in response to the request, entering the second editing context wherein only items associated with the first object are accessible for editing, wherein a second object is not accessible for editing while in the second editing context; and while in the second editing context, associating the second object with the first object, wherein associating the second object with the first object changes the second object to be accessible for editing while in the second editing context;

wherein, while in the second editing context, objects not accessible for editing are distinguished from the items that are editable in the second editing context.

24. A method comprising:

executing instructions on a computing platform to present a first editing context within a graphical user interface, the first editing context comprising a set of one or more objects within the computer application project, each object having content;

executing instructions on the computing platform to receive a request to edit the content of a first object, wherein editing the content of the first object occurs in a second editing context different from the first editing context; and executing instructions on the computing platform so that in response to the request, the second editing context is entered, wherein only the content within the first object are accessible for editing, wherein a second object is not accessible for editing while in the second editing context; and executing instructions on the computer platform so that, while in the second editing context, to associate the second object with the first object, wherein associating the second object with the first object changes the second object to be accessible for editing while in the second editing context; and wherein objects editable in the first editing context are distinguished from objects editable in the second editing context.

* * * * *